(No Model.)
H. L. LONG.
POTATO DIGGER.
No. 572,646.
Patented Dec. 8, 1896.
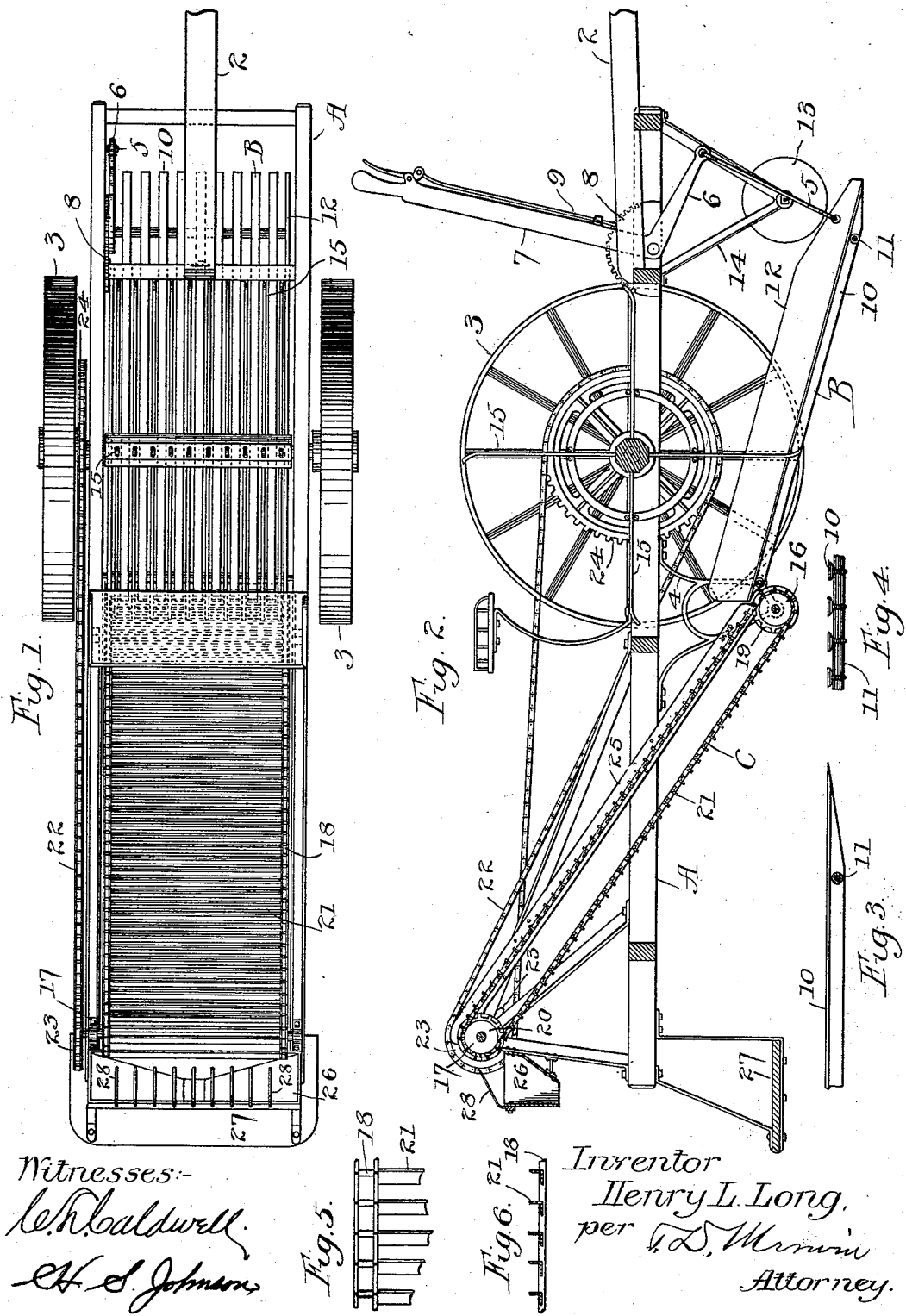
Witnesses:—
C. H. Caldwell.
C. H. S. Johnson.
Inventor
Henry L. Long,
per T. D. Urmin
Attorney.

UNITED STATES PATENT OFFICE.

HENRY L. LONG, OF ST. PAUL, MINNESOTA, ASSIGNOR OF ONE-HALF TO JOHN D. ROBERTS, OF SAME PLACE.

POTATO-DIGGER.

SPECIFICATION forming part of Letters Patent No. 572,646, dated December 8, 1896.

Application filed April 17, 1893. Serial No. 470,589. (No model.)

*To all whom it may concern:*

Be it known that I, HENRY L. LONG, of St. Paul, Ramsey county, Minnesota, have invented certain Improvements in Potato-Diggers, of which the following is a specification.

My invention relates to improvements in machines for digging, cleaning, and sacking potatoes; and it consists in certain improved features of construction hereinafter more particularly described and claimed.

In the accompanying drawings, forming part of this specification, Figure 1 is a plan view of my improved potato-digger. Fig. 2 is a sectional side elevation of the same. Figs. 3 and 4 are details of the scoop, and Figs. 5 and 6 are details of the endless carrier.

In the drawings the frame A is fitted with the pole 2 for attaching a team and is supported upon the driving and carrying wheels 3. Arranged underneath the axle and slightly forward of the wheels is the scoop B, the rear end of which is pivotally supported upon the brackets 4, depending from each side of the frame. The forward end of the scoop is adjustably supported by means of links 5, which are connected to the fulcrum-arms 6 of the bell-crank lever 7, pivoted on the side of the frame. This lever is provided with a quadrant 8 and a dog 9, engaging the teeth of the quadrant, by means of which the lever may be fixed in any desired position to adjust the height of the forward end of the scoop. The scoop itself is made up of T-shaped bars 10, running lengthwise thereof, with open spaces between, as shown best in Fig. 1, and are connected together by means of cross bars or rods 11 to make a strong framework. The forward ends of the bars are chamfered, as shown in detail, Fig. 3, so as to bring them approximately to a cutting edge. On each side of the scoop are arranged the side boards 12 to prevent the potatoes from falling off the sides of the scoop. On each side of the forward end of the scoop I also arrange a wheel-colter 13, journaled in the brackets 14, depending from the frame.

The axle of the machine is arranged to turn in suitable bearings upon the frame and has secured upon it series of cleaner-forks 15, so arranged as to pass with the rotation of the axle in the spaces between the bars 10, the points of the forks having been bent backward as shown, so as to prevent them from crushing or bruising the potatoes. They thus serve to carry the potatoes up on the scoop and toward the rear of the machine and deliver them upon the endless carrier C. This carrier is mounted upon rolls 16 and 17 and driven by means of link belts 18, running over sprocket-wheels 19 and 20, carried by the rolls. The carrier itself is made up of the transverse angle-bars 21, the ends of which are connected to the link belt on each side, the horizontal web of the bars extending in the direction of the travel of the belt. The carrier is driven by means of the link belt 22, running over the sprocket 23 upon the drum 17, and taking its power from the sprocket 24, carried by one of the driving-wheels 3. On each side of the carrier is arranged a side board 25 to prevent the potatoes from falling off while being lifted. At the upper end and in position to receive the potatoes as delivered from the carrier is the chute 26, underneath which may be placed a basket or bag, supported on the platform or step 27, hung from the rear end of the frame A, as shown best in Fig. 2, the vines and other refuse being separated from the potatoes and thrown outside of the chute by means of the tines 28, projecting over the top of the chute.

I claim—

1. In a potato-digger, a scoop made up of angle-bars arranged lengthwise thereof with intermediate spaces, and having their forward ends chamfered to an edge, and a carrier leading from said scoop, made up of transverse angle-bars with intermediate spaces, substantially as described.

2. In a potato-digger, the scoop composed of longitudinal T-shaped bars with intermediate spaces, the forward ends of said bars being chamfered to form a cutting edge, substantially as described.

3. In a potato-digger, a scoop having longitudinal T-shaped bars with intermediate spaces, the ends of said bars being chamfered to a horizontal edge and the cleaning-forks working between said bars, substantially as described.

4. In a potato-digger, the scoop made up of longitudinal T-shaped bars with intermediate spaces, the ends of the bars being chamfered to form a cutting edge, means for adjusting the position of the forward end of the scoop, means for carrying the contents backward from said scoop, and an endless carrier to receive said contents, substantially as described.

5. In a potato-digger, the combination of the scoop made up of longitudinal T-shaped bars with intermediate spaces, and the endless carrier made up of transverse angle-bars with intermediate spaces, substantially as described.

6. In a potato-digger, the combination with the vehicle, of the scoop hung underneath the axle and composed of longitudinal T-bars with intermediate spaces having their forward ends chamfered to a cutting edge, means for adjusting at will the height of the forward end of the scoop, the wheel-colters adjacent to the forward end of the scoop, the cleaning-forks rotating between the bars and adapted to force the contents backward, the endless carrier made up of transverse angle-bars, the chute and the interposed tines, substantially as described.

In testimony whereof I have hereunto set my hand this 6th day of April, 1893.

HENRY L. LONG.

Witnesses:
T. D. MERWIN,
H. S. JOHNSON.